(12) United States Patent
Smith

(10) Patent No.: US 10,213,928 B1
(45) Date of Patent: Feb. 26, 2019

(54) COMBINATION DOUBLE-SIDED KNIFE AND GIG ASSEMBLY

(71) Applicant: Greg Smith, Simi Valley, CA (US)

(72) Inventor: Greg Smith, Simi Valley, CA (US)

( * ) Notice: Subject to any disclaimer, the term of this patent is extended or adjusted under 35 U.S.C. 154(b) by 1 day.

(21) Appl. No.: 15/347,930

(22) Filed: Nov. 10, 2016

(51) Int. Cl.
| | | |
|---|---|---|
| B62B 11/00 | (2006.01) | |
| B26B 11/00 | (2006.01) | |
| B26B 29/02 | (2006.01) | |
| B25G 1/06 | (2006.01) | |
| F41B 13/00 | (2006.01) | |
| A01M 31/00 | (2006.01) | |
| A01K 81/04 | (2006.01) | |

(52) U.S. Cl.
CPC .............. *B26B 11/00* (2013.01); *A01K 81/04* (2013.01); *A01M 31/00* (2013.01); *B25G 1/06* (2013.01); *B26B 29/025* (2013.01); *F41B 13/00* (2013.01)

(58) Field of Classification Search
CPC ............................. B62B 19/143; B62B 19/148
USPC ........................................................ 224/332
See application file for complete search history.

(56) References Cited

U.S. PATENT DOCUMENTS

| | | | | | |
|---|---|---|---|---|---|
| 1,488,716 | A | * | 4/1924 | Spitler | E21B 31/20 294/86.21 |
| 1,814,547 | A | * | 7/1931 | Edwards | A47G 21/06 30/143 |
| 2,117,937 | A | * | 5/1938 | Brownell | B26B 29/025 224/232 |
| 2,685,734 | A | * | 8/1954 | Ernest | A22B 5/0047 30/144 |
| 3,126,629 | A | * | 3/1964 | Claisse | A61B 17/3211 206/363 |
| 4,442,559 | A | * | 4/1984 | Collins | B26B 3/06 30/153 |
| 4,707,920 | A | * | 11/1987 | Montgomery | B26B 3/06 30/294 |
| 4,980,977 | A | * | 1/1991 | Matin | B26B 29/02 30/151 |
| 5,002,213 | A | * | 3/1991 | Newton | A45F 5/14 224/232 |
| 5,146,684 | A | * | 9/1992 | Hagler | B26B 29/025 224/232 |
| 5,581,893 | A | * | 12/1996 | Ouellette | B26B 29/02 30/286 |
| 8,819,945 | B2 | * | 9/2014 | Reibold | B26B 1/10 30/2 |
| 2008/0000092 | A1 | * | 1/2008 | Vanguard | A47G 21/02 30/147 |

(Continued)

*Primary Examiner* — Sean Michalski
*Assistant Examiner* — Fernando Ayala
(74) *Attorney, Agent, or Firm* — Sandy Lipkin

(57) ABSTRACT

A combination tool that at one end has a knife and at the other end has a three pronged fork. The two sides are separated by a bridge with a loop attached thereto. One side of the tool has a thin hollow sheath that covers the side when not in use whereas the opposing side has a removable, locking handle that covers it when not in use. Both the sheath and the removable, locking handle are wrapped in paracord for use when deploying the tool and for having paracord at hand. A specialized, removable cleat is attachable and removable from the tool that provides notches that are also found on the top edge of the knife end and the top and bottom prongs of the fork end and also to provide a blunt surface that prevents the paracord from being cut when wrapped around the knife blade.

7 Claims, 8 Drawing Sheets

(56) References Cited

U.S. PATENT DOCUMENTS

| | | | |
|---|---|---|---|
| 2011/0252649 A1* | 10/2011 | Lovitz | B26B 29/025 30/162 |
| 2013/0152403 A1* | 6/2013 | Haddock | A47G 21/02 30/148 |
| 2014/0251098 A1* | 9/2014 | Qian | B26B 9/00 83/13 |

* cited by examiner

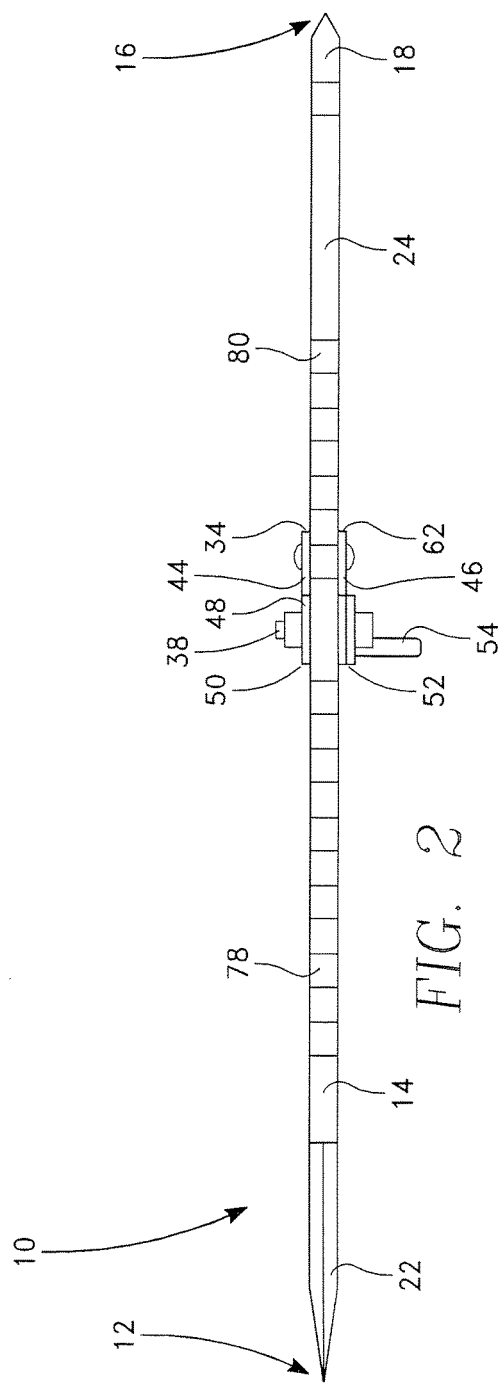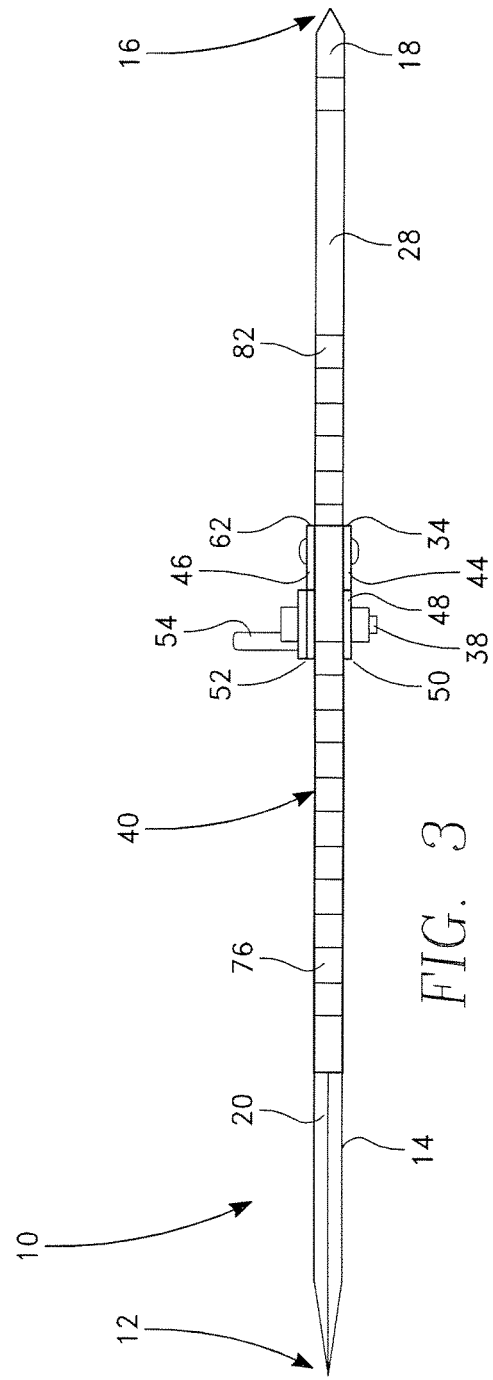

COMBINATION DOUBLE-SIDED KNIFE AND GIG ASSEMBLY

The field of this invention relates generally to the field of camping and survival tools, and specifically toward knives and gigs which are multi-pronged spears also referred to as tridents, which are three-pronged spears, as used for fishing and are mythologically associated with Neptune, God of the Sea.

DESCRIPTION OF THE PRIOR ART

There are countless uses for a hand-held knife or spear while camping or otherwise finding oneself in a wild or survival situation. Knife uses range from cutting twine, cutting meat and basically any time something needs to be surgically altered with a sharp edge. Spears can be used for killing fish and provides a weapon for self-defense or for hunting to impale small game. The uses are endless and because of this, a knife is generally considered a necessity in a camping or survival situation or hunting and a spear will enhance your odds for survival in a camping or hunting situation.

Forks are likewise useful tool when eating meat or fish one has captured. Spear poles are also useful tools in camping and survival situations. A spear pole gig is similar to a fork in that it is a pronged tool, but it is attached to a long shaft that is often used for spearing fish and could also be used for hunting small game. Gigging is the practice of hunting fish or small game with a gig or similar multi-pronged spear. A gig can refer to any long pole which has been tipped with a multi-pronged spear. The gig pole ranges in length from 8 to 14 feet for fish gigs and 5 to 8 feet for frog gigs. A gig typically has three or four barbed tines similar to a trident. Knives, forks, spears and spear pole gigs are essential tools while camping and fending for oneself. However, in both camping and survival situations, keeping things compact and easy to pack and assemble is another serious concern.

It is the object of the present invention to provide a combination tool that is convertible into four different tools, including a hand-held knife on one end and a hand-held multi-pronged spear on the other end. The ends can be converted to a spear pole on the knife end and a spear pole gig on the multi-pronged spear end through a series of simple conversion steps utilizing the component parts of the tool. The tool is convertible for use with either side and is attachable to a spear pole through a specialized cleat as well as particular modifications to the tool structure itself. Both sides of the tool are compactly stored and safely kept. A sheath covers one end and a removable, locking handle covers the other end. These components protect the tools as well as the user's hands as will be described in detail below. Furthermore, the specialized sheath and removable, locking handle come with paracord wrapped therearound to use when converting the hand-held tool for its preferred used at any time to help in attachment to a spear pole. The paracord is also there for a multitude of potential needs that require the use of cordage.

SUMMARY OF THE INVENTION

The basic embodiment of the present invention teaches a combination tool comprising: a first end having a knife disposed at said first end, said knife having a sharp bottom edge and a non-sharp top edge, said non-sharp edge having a first plurality of notches therealong; a second end having a multi-pronged spear disposed at said second end, said multi-pronged spear having a first top prong and a second bottom prong, said top prong having a second plurality of notches therealong and said bottom prong having a third plurality of notches therealong wherein said first end and said second are a continuous integral one piece separated by a bridge.

The above embodiment can be further modified by defining that said multi-pronged spear has a third prong situated between said top prong and said bottom prong.

The above embodiment can be further modified by defining that said third prong is sharpened to a point.

The above embodiment can be further modified by defining that said top prong has a sharpened edge.

The above embodiment can be further modified by defining that said bottom prong has a sharpened edge.

The above embodiment can be further modified by defining that a removable cleat is attachable to said tool adjacent said bridge wherein said cleat has a vertical portion having a first side and a second side wherein said first side and said second side of said vertical portion create a space into which said tool is secured and wherein said cleat has a horizontal portion having a first side and a second side wherein said first side and said second side of said horizontal portion create a space into which said sharp edge of said knife is secured and wherein a joint separates said vertical portion and said horizontal portion thereby allowing said cleat to be attachable and removable to said tool.

The above embodiment can be further modified by defining that said bridge has a loop attached thereto.

The above embodiment can be further modified by defining that a sheath that is substantially rectangular in shape and contains a hollow interior is attachable to one of said first or second ends of said tool to protect either said multi-pronged spear portion or said knife portion wherein paracord is wrapped around said sheath and wherein a removable, locking handle that is substantially rectangular in shape and contains a hollow interior is attachable to the other of said first or second ends of said tool to protect the other portion not protected by said sheath wherein paracord is wrapped around said removable, locking handle and wherein said removable, locking handle has a first strap attached thereto to secure said removable, locking handle with a second strap wherein said strap terminates in a clasp that is attachable to said loop.

The above embodiment can be further modified by defining that said sheath and removable, locking handle are removed from either of said ends of said tool and wherein one end of said ends of said tool is placed into a channel in an external spear pole and attached thereto with said paracord exposing said end not placed into said channel exposing said end of said tool for use with said spear pole converting said knife end or said multi-pronged spear end into a hunting spear, fishing gig, or self-defense weapon.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 2 is a first side view of the double-sided tool outside of the specialized sheath and removable, locking handle.

FIG. 3 is a second side view of the double-sided tool outside of the specialized sheath and removable, locking handle.

DETAILED DESCRIPTION OF A PREFERRED EMBODIMENT

Figure 1:
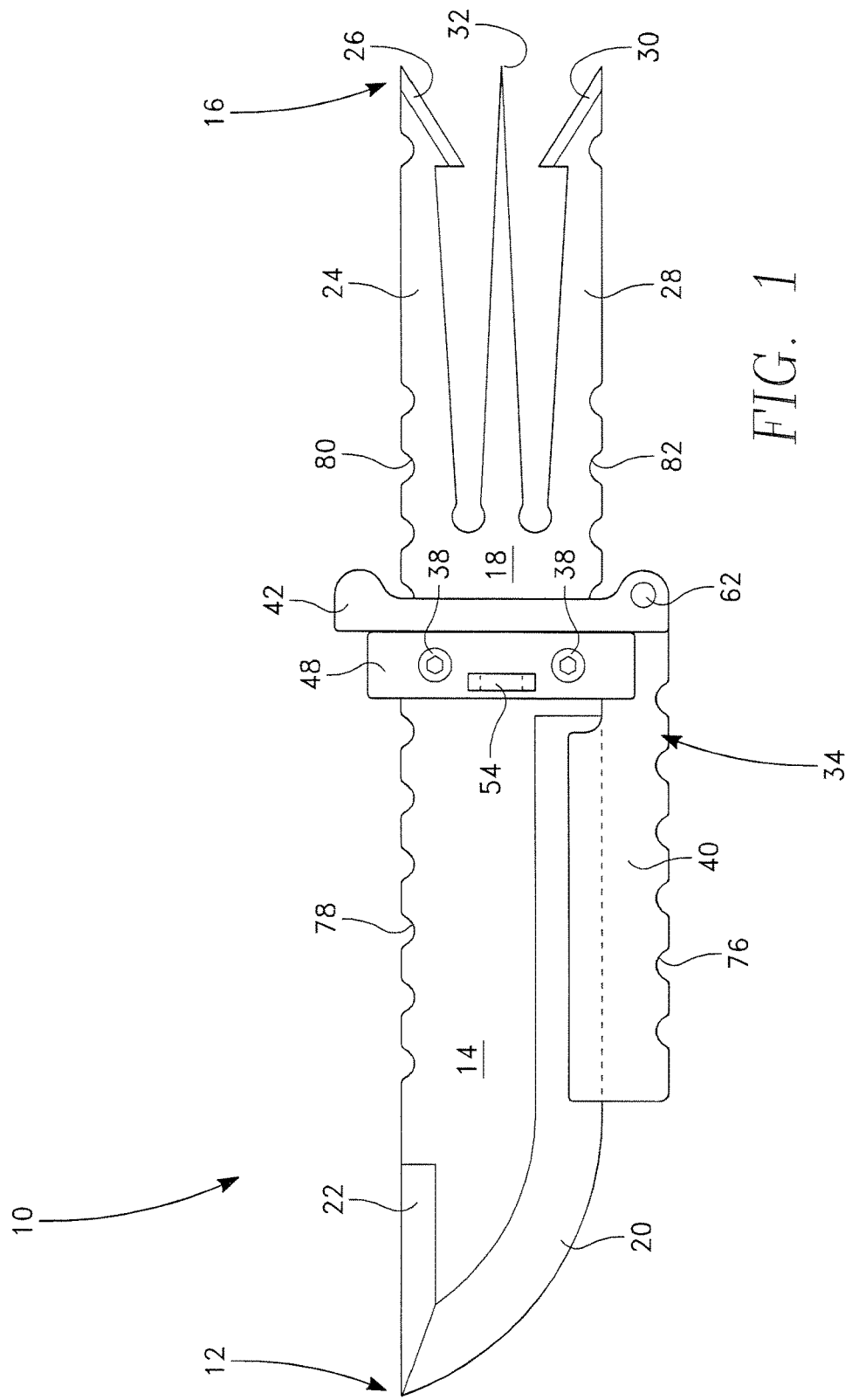
FIG. 1 is a front view of the double-sided tool outside of the specialized sheath and removable, locking handle.

Turning to the drawings, the preferred embodiment is illustrated and described by reference characters that denote similar elements throughout the several views of the instant invention.

The preferred embodiment provides for a double-sided tool 10 having at its first end 12 a knife 14 and at its second end 16 a three-pronged multi-pronged spear 18. The knife 14 has a sharpened edge 20 and a top edge 22. The top edge 22 of the knife 14 has a series of notches 78 to aid in the wrapping of paracord 66 therearound when in use. The multi-pronged spear 18 has a top prong 24 with a sharpened edge 26 and a bottom prong 28 with a sharpened edge 30. In between the top prong 24 and the bottom prong 28 is a middle prong 32 that can be sharpened to a point as desired. The top prong 24 of the multi-pronged spear 18 has a series of notches 80 like the top edge 22 of the knife 14. Likewise, the bottom prong 24 of the fork 18 has its own series of notches 82. The first top set of notches 80 and the bottom series of notches 82 on the multi-pronged spear 18 are provided in parallel alignment with each other to provide a place to wrap paracord 66 therearound and to protect the paracord 66 from being cut by the sharp edges 26, 30 of the top 24 and bottom 28 prongs of the multi-pronged spear 18 just as the first series of notches 78 in the knife portion 14 are in parallel alignment with the notches 76 found on the cleat 34 described below.

The tool 10 is a continuous piece that is fabricated as a single integrated tool. There is a bridge 48 between the knife 14 and the fork 18 ends. The bridge 48 has a front side 50 and a back side 52. The front side 50 and the back side 52 are securable together with a pair of screws 38. The front side 50 or back side 52 has attached thereto a loop 54. It is of no consequence which side 50, 52 has the loop 54 attached thereto and is illustrated both ways in the attached drawings. This loop 54 provides a means of attaching the removable, locking handle 64 thereto.

The Cleat

Between the two ends 12, 16 is a specialized cleat 34. The cleat 34 is removable and is used to provide stability for when the tool 10 is wrapped around a spear pole 36 and also to provide a blunt surface that prevents the paracord from being cut when wrapped around the knife blade as when the paracord 66 is wrapped around the top prong 24 and bottom prong 28 of the multi-pronged spear 18.

The cleat 34 has a substantially L-shape with a horizontal portion 40 and a vertical portion 42. The horizontal portion 40 extends along the sharp edge 20 of the knife 14 and is shaped to have a first side 44 and a second side 46 creating a space therebetween 84 in which the sharp edge 20 of the knife 14 is secured and provides protection against accidentally cutting the paracord 66 by providing a blunt surface that will not cut the paracord 66. The first side 44 of the horizontal portion 40 and the second side 46 of the horizontal portion 40 each have a series of notches 76 to be utilized as the notches in the knife 78 and the multi-pronged spear 80, 82.

Figure 4:
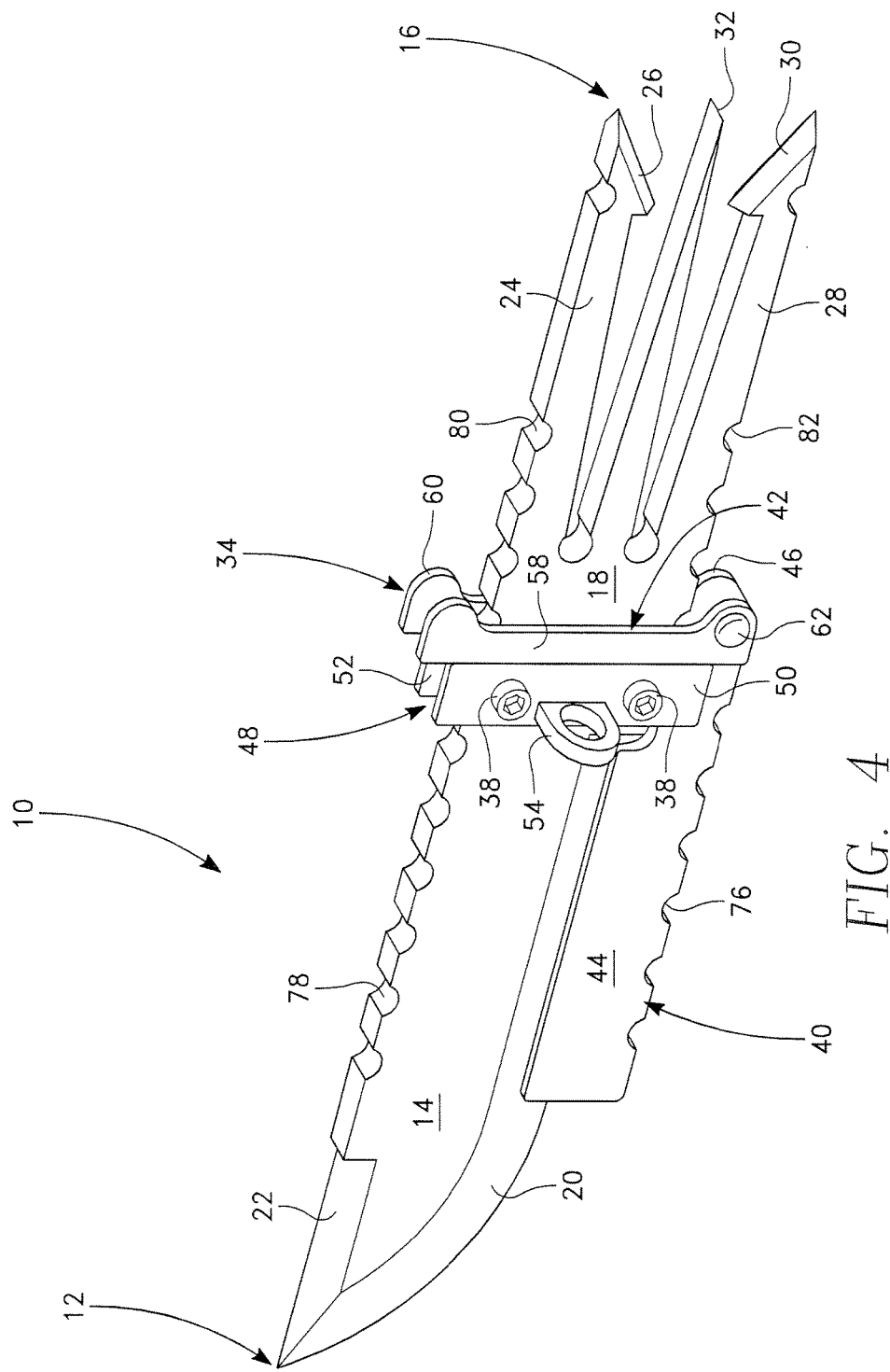
FIG. 4 is a perspective view of the double-sided tool outside of the specialized sheath and removable, locking handle.
Figure 5:
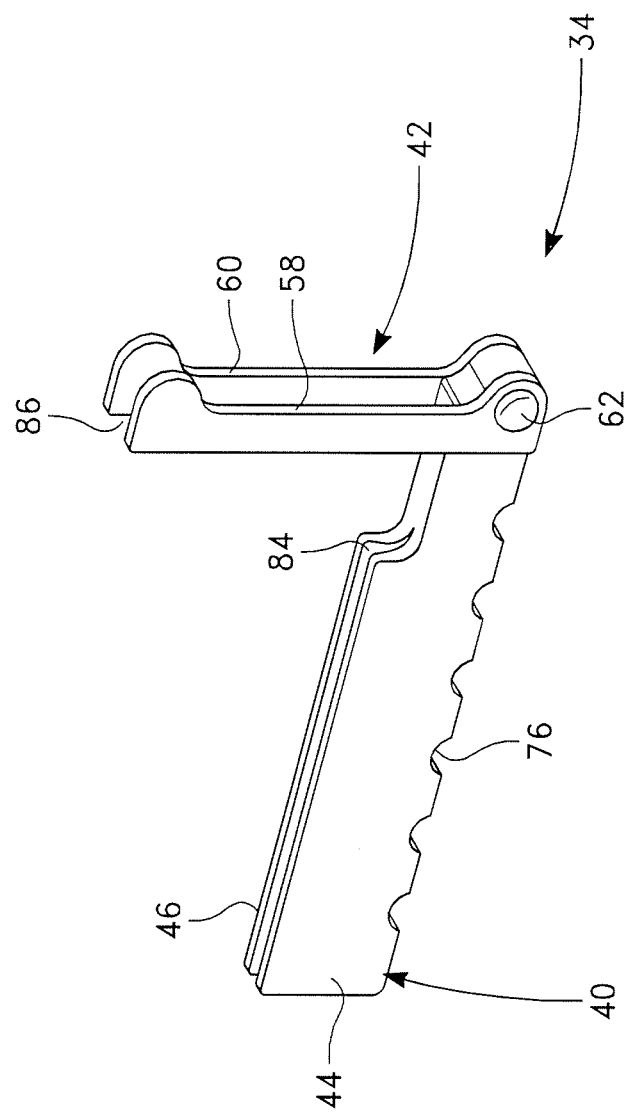
FIG. 5 is a perspective view of the cleat of the instant invention.
Figure 6:
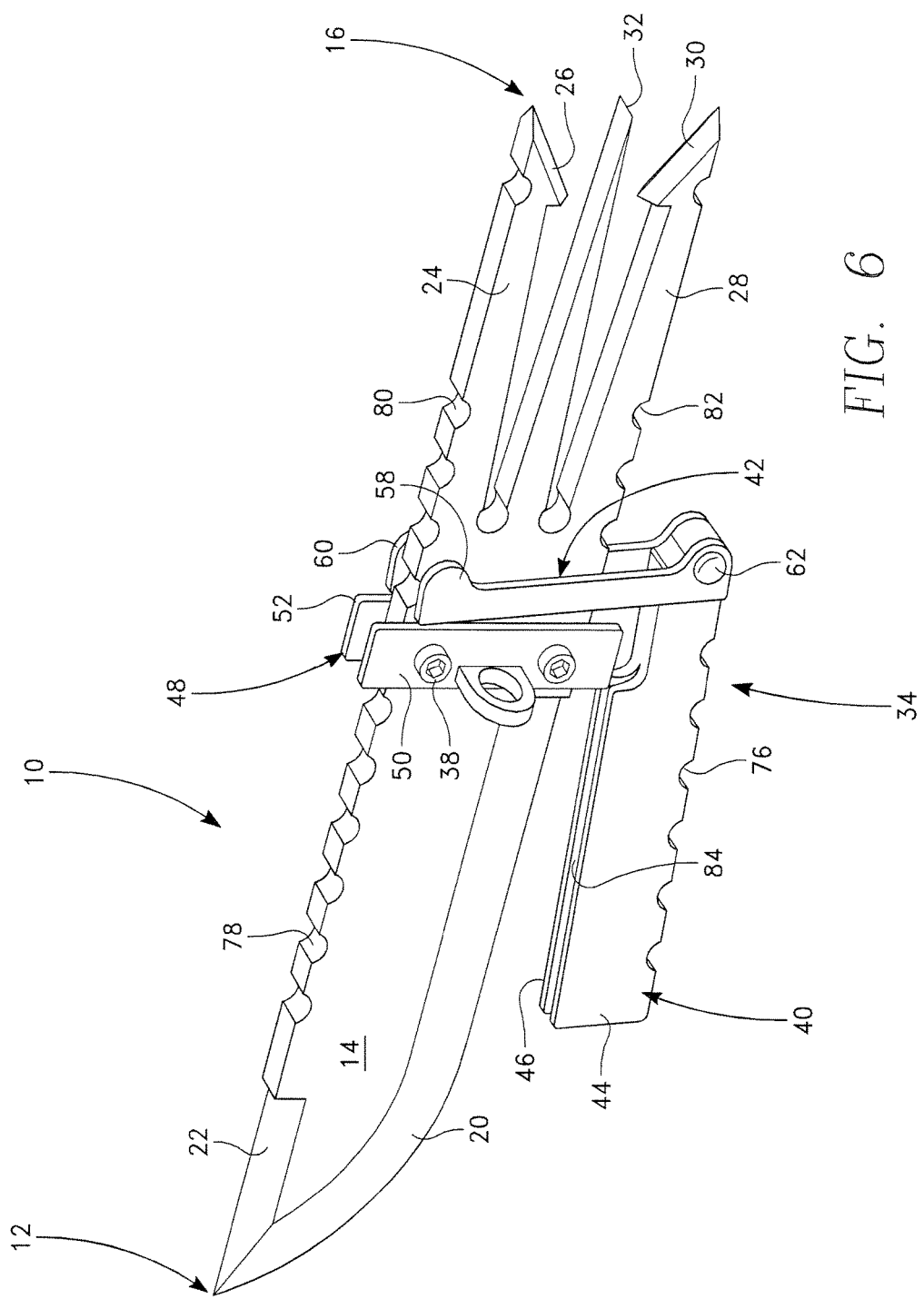
FIG. 6 is an exploded view of the cleat and the double-sided tool of the instant invention.

The vertical portion 42 likewise has a first side 58 and a second side 60 creating a space therebetween 86 into which the multi-pronged spear 18 fits and that abuts against the bridge 48. There is a joint 62 in the cleat separating the vertical portion 42 from the horizontal portion 40 and that allows freedom of movement of the vertical portion 42 and the horizontal portion 40 around the joint 62 so that the cleat 34 can be attached or removed from the tool 10 as desired (See FIGS. 4-6).

Figure 7:
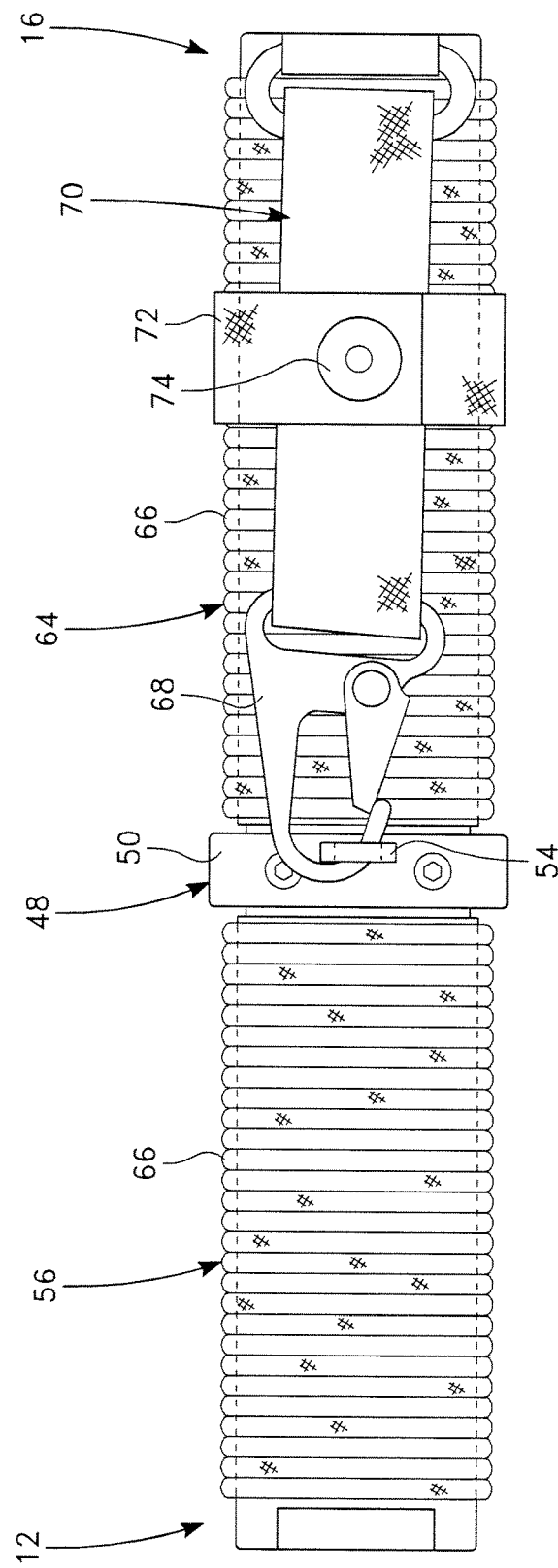
FIG. 7 is a front view of the double-sided tool with one side secured inside of the sheath and the other side secured inside of the removable, locking handle.

FIG. 7 shows the tool 10 in its compact, storage form wherein a sheath 56 covers one portion of the tool, it could be the knife 14 or it could be the multi-pronged spear 18. This sheath 56 is substantially rectangular having a hollow interior portion into which the side of the tool 10 is placed and kept safe when not in use. This sheath 56 is wrapped in paracord 66 which can be used to wrap the tool 10 or for any other use when in primitive conditions.

The Removable, Locking Handle

A removable, locking handle 64 surrounds the other side of the tool 10 and is likewise wrapped in paracord 66. Additionally, the removable, locking handle 64 has attached thereto a strap 70 that is secured to the removable, locking handle 64 and has at one end a clasp 66 that is attachable to the loop 54 on the bridge 48. This strap 70 is secured to the removable, locking handle 64 with a closing, adjustable VELCRO® strap 72.

Figure 7A:
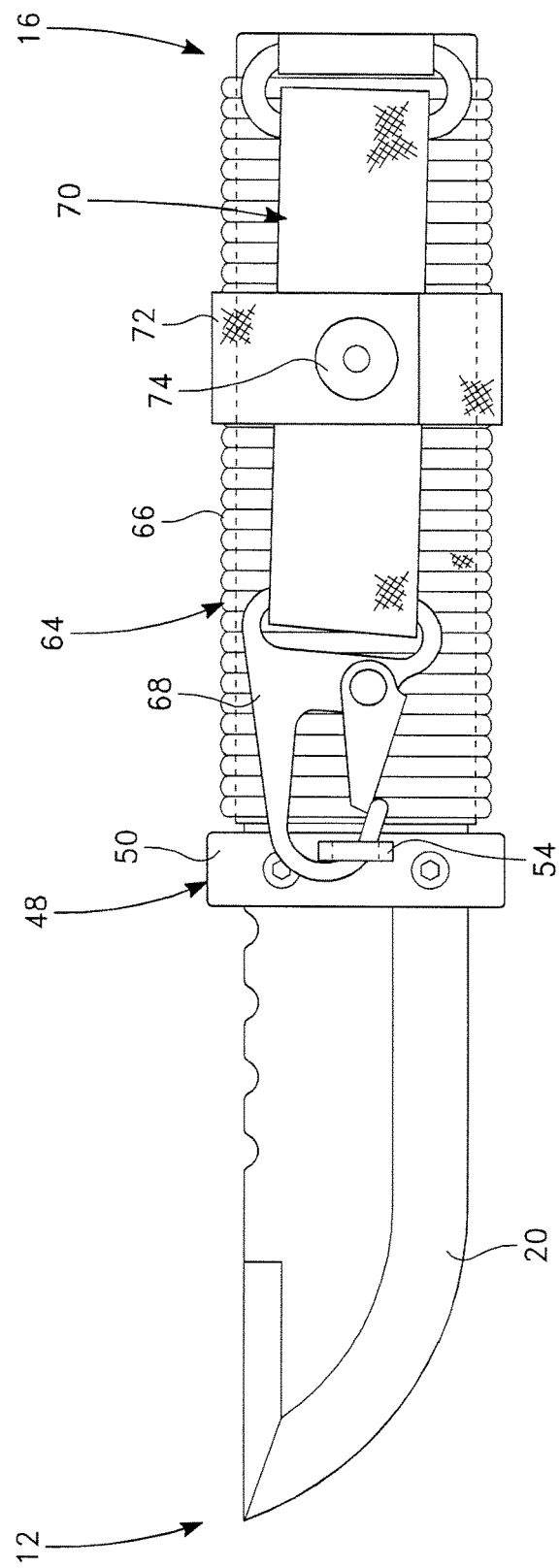
FIG. 7A is the view as shown in FIG. 7 with the sheath removed from the knife side of the tool and the removable, locking handle remaining in place on the multi-pronged spear side.

FIG. 7A shows the tool 10 with the sheath 56 removed from the knife 14 end of the tool 10 exposing the sharp edge 20. The removable locking handle 64 remains secured in place on the multi-pronged spear end 16 through attachment of the clasp 68 to the loop 54 on the bridge 48. This allows the knife 14 portion of the tool 12 to be utilized by gripping the multi-pronged spear end 16 of the tool 12 with the removable, locking handle 64 protecting the user's hand and providing a larger gripping area.

Figure 8:
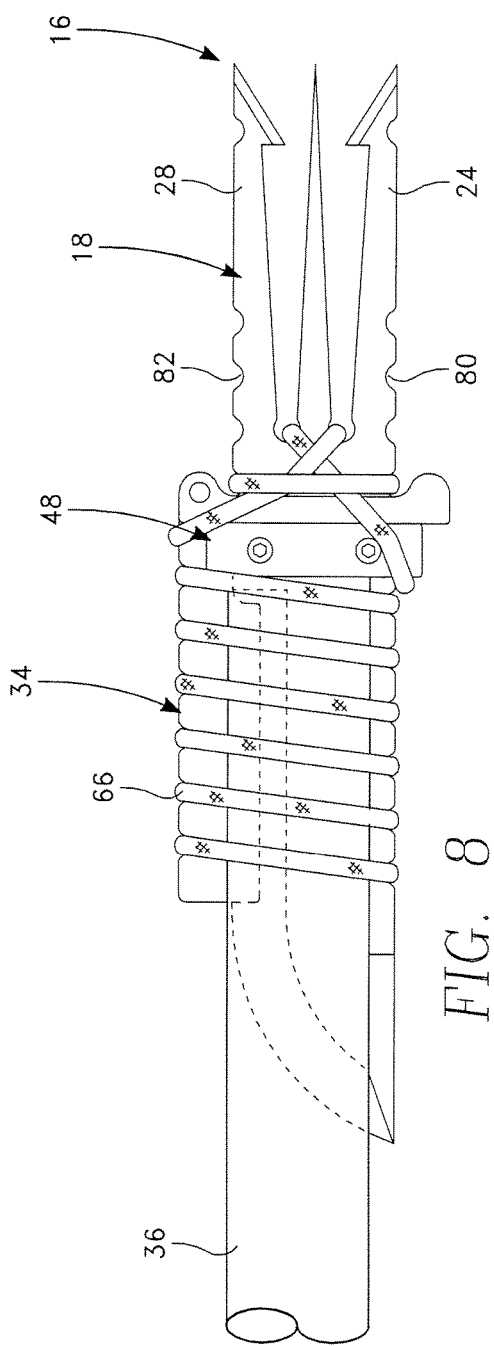
FIG. 8 shows the multi-pronged spear side of the tool of the instant invention as it is attached to a spear pole converting it from a hand-held fork into a spear gig.
Figure 9:
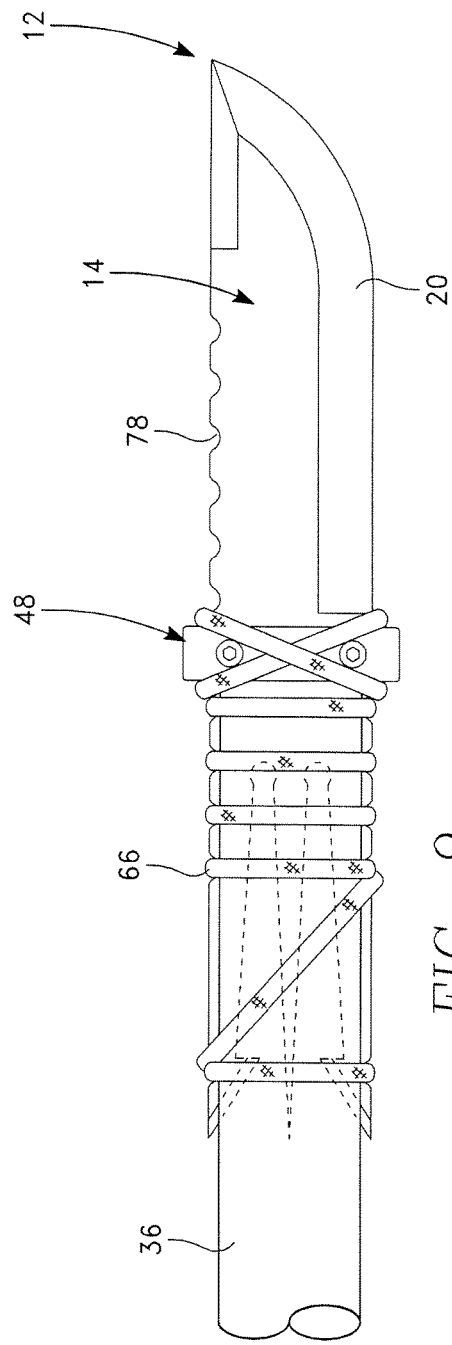
FIG. 9 shows the knife side of the tool of the instant invention as it is attached to a spear pole converting it from a hand-held knife into a spear.

FIGS. 8-9 show either side of the tool as it is removed from its sheath and attached to a spear pole 36 with the paracord 66 to be deployed with greater force for its intended use. In FIG. 8 it is the multi-pronged spear 18 portion of the tool that is exposed and attached to the spear pole 36 with the paracord 66. As can be seen in FIG. 8 the sheath 56 that was over the fork 18 has been removed and the removable, locking handle 64 has likewise been removed from the knife 14. The paracord 66 that was around that sheath 56 has been used to wrap around the middle prong 36 of the fork as well as the notches in the top prong 80 and the notches in the bottom prong 82. The paracord 66 is then wrapped around the bridge 48 several times and then around the notches in the first and second sides of the horizontal portion of the cleat 34 and the top edge 22 of the knife 14. Since the notches extend down a length of the spear pole 36 a substantial distance, the multi-pronged spear is tightly secured thereto and a tool with a long shaft has been created with this action. The hand-held multi-pronged spear has now become a powerful gig for frogging or spear fishing.

As can be seen in FIG. 9, the removable, locking handle 64 that was over the knife 14 has been removed. The paracord 66 that was around that removable, locking handle 64 has been used to secure the tool 10 to the spear pole 36. As with the multi-pronged spear portion 18 above, once the two sides 12, 16 are removed from either the sheath 56 or the removable, locking handle 64, one side of the tool 10 is exposed for use and the other side is slipped into a channel created in the spear pole 36 and secured thereto with paracord 66. In this case, the paracord 66 wraps around the bridge 48 and through the notches 80 in the top prong 24 of the multi-pronged spear 18 as well as the notches 82 in the bottom prong 28 of the multi-pronged spear 18. Now the hand-held knife 14 has been converted into a much more powerful spear due to the extended length now acquired through attachment to the spear pole 36 for hunting or self-defense.

What is claimed is:

1. A combination tool comprising:
   a first end having a knife disposed at said first end, said knife having a sharp bottom edge and a non-sharp top edge, said non-sharp edge having a first plurality of notches therealong first said plurality of notches being of sufficient depth to secure therein paracord that has been wrapped around said tool;
   a second end having a multi-pronged spear disposed at said second end, said multi-pronged spear having a first top prong and a second bottom prong, said top prong having a second plurality of notches therealong said second plurality of notches being of sufficient depth to secure therein paracord that has been wrapped around said tool and said bottom prong having a third plurality of notches therealong said third plurality of notches being of sufficient depth to secure therein paracord that has been wrapped around said tool wherein said first end and said second end combine to form a continuous integral one piece separated by a bridge;
   a removable cleat attachable to said tool adjacent said bridge wherein said cleat has a stabilizing leg having a first side and a second side wherein said first side and said second side of said stabilizing leg create a space into which said tool is secured proximate said bridge and wherein said cleat has a protective leg positioned substantially 90 degrees from said stabilizing leg, said protective leg having a first side and a second side wherein said first side and said second side of said protective leg define a groove into which said sharp edge of said knife is secured therein and wherein said first side and said second side of said protective leg each contain a fourth plurality of notches wherein a joint separates said stabilizing leg and said protective leg of said cleat thereby allowing said cleat to be attachable to and removable from said tool;
   whereby said first set of notches is situated in alignment with and substantially parallel to said fourth set of notches and said second set of notches is situated in alignment with and substantially parallel to said third set of notches thereby providing securing slots for when paracord is wrapped therearound.

2. The combination tool as defined in claim 1 wherein said multi-pronged spear has a third prong situated between said top prong and said bottom prong.

3. The combination tool as defined in claim 2 wherein said third prong is sharpened to a point.

4. The combination tool as defined in claim 1 wherein said top prong has a sharpened edge.

5. The combination tool as defined in claim 1 wherein said bottom prong has a sharpened edge.

6. The combination tool as defined in claim 1 wherein said bridge has a loop attached thereto.

7. The combination tool as defined in claim 6 wherein a sheath that is substantially rectangular in shape and contains a hollow interior is attachable to one of said first or second ends of said tool to protect either said multi-pronged spear portion or said knife portion wherein paracord is wrapped around said sheath and wherein a removable locking handle that is substantially rectangular in shape and contains a hollow interior is attachable to the other of said first or second ends of said tool to protect the other portion not protected by said sheath wherein paracord is wrapped around said removable, locking handle and wherein said removable, locking handle has a first strap attached thereto to secure said removable, locking handle with a second strap wherein said strap terminates in a clasp that is attachable to said loop.

* * * * *